Patented June 24, 1952

2,601,287

UNITED STATES PATENT OFFICE 2,601,287

PARTIAL SYNTHESIS OF PROGESTERONE

Frederick W. Heyl and Milton E. Herr, Kalamazoo, Mich., assignors to The Upjohn Company, Kalamazoo, Mich., a corporation of Michigan No Drawing. Application August 18, 1949, Serial No. 111,098

8 Claims. (Cl. 260—397.3)

The present invention relates to a novel synthesis of progesterone which proceeds through certain key intermediates, and to the intermediates of importance in the said synthesis. The invention more particularly relates to the synthesis of progesterone from stigmastadienone by a simple series of reactions involving ozonolysis, reductive decomposition of the ozonide, esterification, ozonolysis, and decomposition of the ozonide.

It is an object of the present invention to provide a novel and facile method for the synthesis of progesterone. Another object is the provision of such process which proceeds from stigmastadienone through the steps of ozonolysis, reductive decomposition of the ozonide to 3-ketobisnor-4-cholene-22-al, esterification of the 22-enol alcohol thus produced, ozonolysis, and decomposition of the resulting ozonide to produce progesterone. Still another object is the provision of such process which involves, as an alternative route, ozonolysis of stigmastadienone, reductive decomposition of the ozonide to 3-ketobisnor-4-cholene-22-al, diesterification of the 3,22-dienol alcohol of the keto aldehyde thus produced, ozonolysis, decomposition of the ozonide, and hydrolysis of the 3-enol ester to yield progesterone. A further object is the provision of 3 - ketobisnor - 4-cholene - 22 - al and mono- and bis-enol esters thereof. Other objects of the invention will become apparent hereinafter.

The series of reactions comprising the method of the present invention is outlined schematically in the following illustrative diagram:

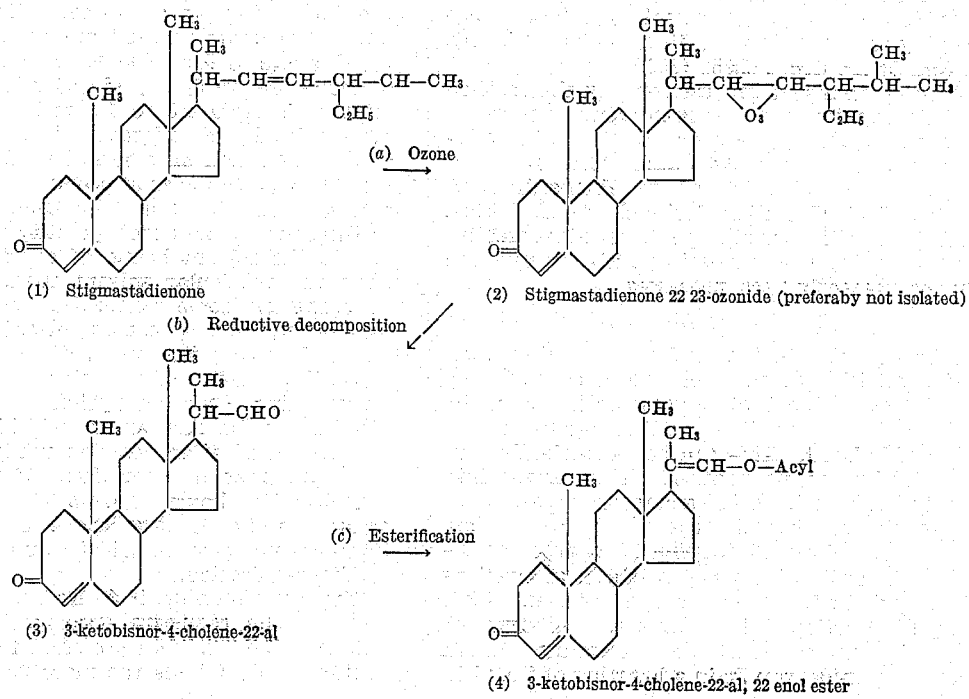

(1) Stigmastadienone (a) Ozone →

(2) Stigmastadienone 22 23-ozonide (preferably not isolated)

(b) Reductive decomposition ↙

(3) 3-ketobisnor-4-cholene-22-al (c) Esterification →

(4) 3-ketobisnor-4-cholene-22-al, 22 enol ester

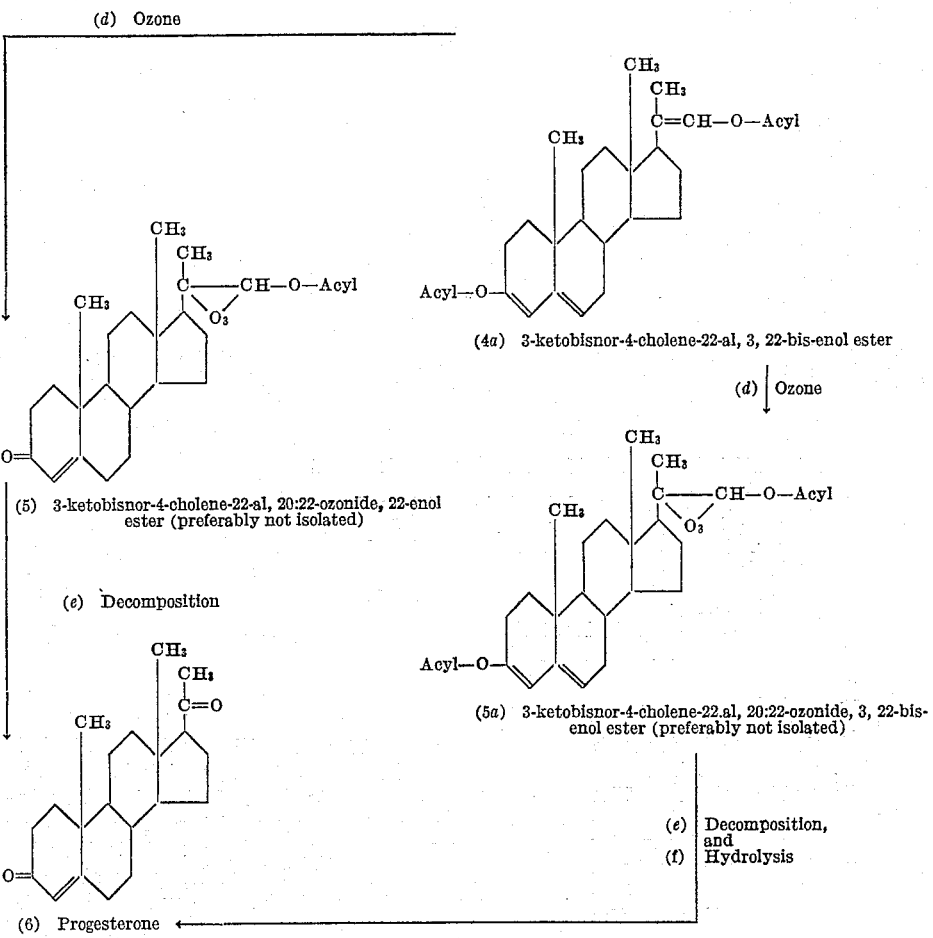

As indicated by the foregoing diagram, progesterone can be obtained by means of a relatively simple synthesis involving ozonolysis of stigmastadienone, reductive decomposition of the ozonide, esterification of the 3-ketobisnor-4-cholene-24-al thus obtained to give an enol ester, ozonolysis of the enol ester, decomposition of the ozonide, and isolation of the progesterone thus formed. Stigmastadienone can be obtained from stigmasterol by oxidation according to the method of Fernholz and Stavely, J. Am. Chem. Soc. 61, 2956 (1939).

The synthesis of progesterone by the method of this invention involves many fewer steps than previously known methods starting with stigmasterol, as shown by Fieser, "Chemistry of Natural Products Related to Phenanthrene," page 386, third edition, Reinhold Corp. (1949), and in addition avoids the use of protective groups during the synthesis, which are required by the presently used processes.

STEPS (A) AND (B)

The first step in the method of the invention is the addition of one molecule of ozone to the 22:23 double bond of stigmastadienone, without at the same time adding ozone to the 4,5-double bond. This can be conveniently carried out by passing ozonized air or oxygen into a solution of stigmastadienone at temperatures below about thirty degrees centigrade, preferably from minus 30 to plus 10 degrees centigrade, according to known methods of ozonization, until one molecule of ozone has been added. The introduction, into the reaction mixture, of appreciably more ozone than necessary to form a mono-ozonide, results in a lowering of the yield of the desired ozonide due to undesirable secondary reactions brought about by the excess ozone. Representative solvents useful for the ozonization include chloroform, carbon tetrachloride, mixtures of ether and chloroform, glacial acetic acid, methylene chloride, and methanol. Some of the common solvents used in ozonization, for example, chloroform, destroy a part of the ozone so that a determination of the total quantity of ozone to be introduced into the reaction mixture must make allowance for this loss to the solvent. The total quantity of ozone preferably introduced into the reaction mixture is from 1.0 to 1.5 molecules of ozone per molecule of stigmastadienone, over and above any which may be lost to the solvent, or from 1.25 to 2.0 moles of ozone per mole of stigmastadienone, including the amount to be lost to the solvent, the exact quantity which will be lost to the solvent being, of course, dependent upon the particular solvent used. The action of ozone on some ozonization solvents, such as chloroform, also causes formation of acidic material during the ozonization, and, in such cases, the addition of a small quantity of a tertiary amine, such as pyridine, triethylamine, picoline, or the like, as an acid-binding agent, into the ozonization reaction mixture is a preferred manner of operation. The amount of amine added should be from 0.1 to 2.0 percent, or more, and at least sufficient so that the solution does not give an acid test upon completion of the ozonization.

The mono-ozonide, if desired, may be isolated prior to the reductive decomposition step, as known to the art, but a preferred form of the invention contemplates the more usual procedure of reductive decomposition of a solution of the ozonide without isolation thereof. The reductive decomposition of the ozonide can be carried out according to known procedure.

By "reductive decomposition" is meant decomposition in such a manner that the excess oxygen formed by decomposition of the ozonide is prevented from forming hydrogen peroxide by combining with any moisture present, and that molecular oxygen is prevented from oxidizing the 3-ketobisnor-4-cholene-22-al to the corresponding acid. This is conveniently accomplished by decomposing the ozonide with zinc dust in glacial acetic acid. The addition of a small quantity of alcoholic silver nitrate, from which molecular silver is formed during the decomposition, aids in the rapid decomposition of any hydrogen peroxide which may form. Other finely-divided metals, such as silver or magnesium, or non-oxidizing ozonide decomposing agents known in the art, may also be employed. The use of "reductive conditions" in the decomposition of ozonides, is well known in the art; see, for example, Hill and Kelly, "Organic Chemistry," page 53, The Blakiston Co., Philadelphia (1934); Gilman, "Organic Chemistry," page 636, 2nd ed., John Wiley and Sons, New York (1943); Church et al., J. Am. Chem. Soc. 56, 176–184 (1934); and Long, Chem. Reviews 27, 452–454 (1940).

As is conventional with ozonizations, when conducted in solvents other than glacial acetic acid, the solvent used for the ozonization is replaced by glacial acetic acid after completion of the ozonization by adding glacial acetic acid to the ozonide solution and fractionally distilling, under reduced pressure, to remove the original solvent, with introduction of additional acetic acid if necessary. After decomposition of the ozonide, as described above, and removal of the zinc, the aldehyde can be recovered by diluting the acetic acid with water.

The 3-ketobisnor-4-cholene-22-al thus obtained is a crystalline solid, insoluble in water, and moderately soluble to soluble in various common organic solvents, such as glacial acetic acid, chloroform, alcohol, acetone, and the like. This keto-aldehyde can be crystallized from isopropyl ether, and like solvents, and forms the usual aldehyde and ketone derivatives involving the carbonyl group, such as the semi-carbazone, hydrazone, phenylhydrazone, dinitrophenylhydrazone, and the like.

STEP (C)

The next step in the method of this invention is the formation of an enol ester of 3-ketobisnor-4-cholene-22-al. Since the next step in the method of the invention is the oxidation of the 20:22-double bond formed by enolization of the 22-aldehyde, it is of critical importance that the enol ester of the 22-aldehyde group be formed. Under ordinary conditions, the 22-aldehyde group exists in its enolic form in but a small proportion of the whole, with the tautomeric aldehyde form greatly predominating. However, the enol modification is always present and can be prevented from reverting to the tautomeric keto form by esterification of the enolic hydroxyl group. The use of a carboxylic acid anhydride in the presence of an alkali metal salt of the corresponding carboxylic acid is a preferred esterifying agent, although other methods of esterifying enolic hydroxyl groups known in the art, such as esterification by the use of an acid chloride, e. g., acetyl or benzoyl chloride, or the direct esterification of the enolic hydroxyl as by heating with glacial acetic acid in the presence or absence of a catalyst, e. g., sulfuric acid, can be employed. Conditions for the formation of such esters are usually a temperature between about 60 and 150 degrees centigrade, preferably at the reflux temperature of the reaction mixture, and always below the decomposition temperature of the reactants.

The 3-keto group of the 3-ketobisnor-4-cholene-22-al is also capable of enolization in the same manner as the 22-aldehyde group, and the esterification of the enolic 3-hydroxyl group can be carried out under essentially the same reaction conditions as that of the enolic 22-hydroxyl. Formation of the bis-enol ester, is, of course, aided by employment of a molar excess of esterifying agent over that required to esterify the 22-enolic hydroxyl group. However, since only the esterification of the enolic 22-hydroxyl group is critical, the method of the invention contemplates the use of either the 3-keto-22-enol ester or the 3,22-bis-enol ester in subsequent steps. It is probable that a mixture of the 3-keto-22-enol ester and the 3,22-bis-enol ester of the 3-ketobisnor-4-cholene-22-al is formed, under ordinary circumstances, and one embodiment of this invention therefore contemplates the use of such a mixture of enol esters.

Representative esters of the 22-enolic hydroxyl group, or of both the 3 and 22 hydroxyl groups, include the formic, acetic, propionic, butyric, valeric, isovaleric, hexanoic, heptanoic, octanoic, cyclohexanoic, benzoic, toluic, and naphthoic acid esters; the half esters of malonic, glutaric, succinic, adipic, and other dibasic organic acids such as phthalic; and esters of methoxyacetic, chloropropionic, bromobutyric, and other alkoxy-, halo-, alkyl-, and like-substituted derivatives of organic acids such as mentioned in the foregoing. Since the ester group is removed in the subsequent oxidation step, any ester of the 22, or both 22 and 3, enolic hydroxyl group, which will prevent reversion of this form of the aldehyde to the tautomeric keto form, is suitable for the purpose of this invention.

STEP (D)

The next step of the method of this invention is the oxidation of the 20:22 double bond of the 22-enol ester to a carbonyl group. This is preferably carried out with the employment of ozone under essentially the same reaction conditions given for the ozonolysis of the 22:23 double bond of stigmastadienone. The addition of ozone to the 20:22 double bond of the enol ester is so rapid that only a small amount of ozone escapes through the reaction mixture during the formation of the 20:22-ozonide. The amount of ozone employed is from 1.0 to 1.5, preferably 1.0 to 1.25, moles per mole of starting enol ester. The presence of an appreciable quantity of unreacted ozone in the effluent gases from the ozonization reaction mixture can be readily determined by conducting the effluent gas into a solution of potassium iodide, the appearance of the intense color of free iodine indicating the presence of unreacted ozone, or by other known procedure. When formation of the 20:22 ozonide is complete, as shown by a suitable test, the addition of ozone is discontinued and the ozonization solvent, if other than glacial acetic acid, is removed and replaced with glacial acetic acid and the ozonide decomposed with zinc dust or the like, as previously indicated for step (b). This procedure, when the starting material is the 3-keto-22-enol ester, is productive of progesterone.

The progesterone thus obtained can be isolated by dilution of the reaction mixture with water, extracting the solution with ether, benzene, or the like, removing the solvent, and crystallizing the progesterone from a suitable solvent. However, as previously mentioned, and as shown above in the chart at (4a), an enol ester of the 3-keto group may also be present in the molecule. This 3-enol ester group takes no part in the oxidation reaction or decomposition, but must be removed, with reintroduction of the 3-keto group, before progesterone is formed and may be separated as a product of the ozonization of this compound. Since some 3-enol ester may always be present, and since no special precaution need be taken to prevent formation thereof, a preferred modification of the method of this invention involves a hydrolysis step as a precautionary measure to convert any 3-enol ester present to progesterone. The hydrolysis is carried out by removing the organic solvent from the decomposed ozonization reaction mixture, adding a dilute methanolic mineral acid, preferably dilute methanolic sulfuric acid, and heating the solution under reflux. Any material which is insoluble in the methanol solution is removed, whereafter the crude progesterone is isolated by diluting the methanol solution with water, extracting with solvent, drying, and removing the solvent. Pure progesterone, identical with the naturally-occurring product, can be obtained in good yields by crystallization of the above crude product according to known methods for the purification of progesterone, a mixture of ether and hexane being one suitable solvent for the crystallization.

The following exampels are illustrative only and are not to be contrued as limiting.

*Example 1.—3-Ketobisnor-4-cholene-22-al*

A solution of 4.11 parts by weight of stigmastadienone [J. Am. Chem. Soc. 61,2956 (1939)], in a mixture of 375 parts by weight of chloroform and five parts of pyridine, was cooled to five degrees centigrade and a mixture of ozone and oxygen passed into the solution until 0.85 part of ozone had been absorbed. The chloroform was removed under reduced pressure at a temperature below ninety degrees centigrade and a mixture of 25 parts of glacial acetic acid and fifty parts of ether added to the residue. This solution was agitated vigorously with four parts of zinc dust for about five minutes to decompose the ozonide, 300 parts of ether added, and the zinc dust removed by filtration. The filtrate was washed with water, five percent sodium carbonate solution, water, dried, and the solvent removed. Crystallization of the residue from isopropyl ether yielded 1.95 parts of 3-ketobisnor-4-cholene-22-al, melting at 148 degrees centigrade, which, on further crystallization from diethyl ether, melted at 160–161 degrees centigrade.

Calculated for $C_{22}H_{32}O_2$: C 80.43 H 9.82
Found : 80.69 10.02

The residue from the isopropyl ether filtrate, upon crystallization from acetone, yielded 0.73 part of stigmastadienone.

*Example 2.—22-Enolacetate of 3-ketobisnor-4-cholene-22-al*

A solution of 3.42 parts of 3-ketobisnor-4-cholene-22-al, in a mixture of 100 parts of acetic anhydride and 1.7 parts of fused sodium acetate, was heated under reflux in a nitrogen atmosphere for three hours. The acetic anhydride was removed under reduced pressure, the slightly yellow gummy residue dissolved in chloroform, and the insoluble sodium acetate removed. The chloroform was removed and the 22-enolacetate of 3-ketobisnor-4-chlorene-22-al obtained as a non-crystalline solid.

*Example 3.—Progesterone*

The 22-enolacetate of 3-ketobisnor-4-cholene-22-al from Example 2 was dissolved in 225 parts of chloroform and the solution cooled to about five degrees centigrade. An ozone-oxygen mixture was passed into the solution at a temperature of about five degrees centigrade until the effluent gas liberated iodine from potassium iodide, 0.34 part of ozone being absorbed. The chloroform was removed under reduced pressure, a mixture of fifty parts of ether and thirty parts of glacial acetic acid added to the residue, and the resulting solution agitated about five minutes with three parts of zinc dust. Three hundred parts of ether was then added, the zinc dust removed by filtration, and the filtrate washed with water, ten percent sodium hydroxide solution, water, dried, and the solvent removed. The residue was heated under reflux for one hour in a solution of ninety parts of methanol containing fifty parts of five normal sulfuric acid. The reaction mixture was concentrated to a volume of about eighty parts, diluted with water, and extracted four times with ether. The ether solution was washed with water, ten percent sodium hydroxide solution, water, dried, and the solvent removed. There was obtained 2.74 parts of light yellow non-crystalline solid which, after crystallization from ten parts of ether, yielded 1.1 parts of crystalline progesterone, melting at 113–120 degrees centigrade. Further crystallization from acetone gave progesterone, melting at 125–128 degrees centigrade, identical with the natural product and having a progestational activity equal to one international unit per milligram by the Corner-Allen method of assay.

It is to be understood that the invention is not limited to the exact details of operation or compounds shown and described, since obvious modifications and equivalents will be apparent to one skilled in the art, and the invention therefore is to be limited only by the scope of the appended claims.

We claim:

1. A method for the synthesis of progesterone comprising: ozonizing stigmastadienone with an ozonizing agent to produce stigmastadienone 22:23 ozonide, reductively decomposing the ozonide to produce 3-ketobisnor-4-cholene-22-al, esterifying the 22-enold form of the 3-ketobisnor-4-cholene-22-al to produce a 22-enol ester thereof, ozonizing the 22-enol ester with an ozonizing agent to produce the 20:22 ozonide thereof, and decomposing the ozonide to produce progesterone.

2. A method for the synthesis of progesterone comprising: ozonizing stigmastadienone with an ozonizing agent to produce stigmastadienone 22:23 ozonide, reductively decomposing the ozonide to produce 3-ketobisnor-4-cholene-22-al, esterifying at least one of the two enolic hydroxyl groups in the 3 and 22 positions of the enolic form of 3-ketobisnor-4-cholene-22-al, an ester being formed in at least the 22-position, ozonizing the enol ester with an ozonizing agent to produce the 20:22 ozonide thereof, decomposing the ozonide to the 20-ketone, hydrolyzing any 3-enol ester present, and isolating progesterone.

3. A method for the conversion of stigmastadienone to progesterone comprising: ozonizing stigmastadienone with an ozonizing agent to produce stigmastadienone 22:23 ozonide, reductively decomposing the ozonide to produce 3-ketobisnor-4-cholene-22-al, esterifying the 22-enol form of said aldehyde by reacting the enol form of the aldehyde with an acylating agent to produce an enol ester at the 22-position, ozonizing the enol ester with an ozonizing agent to produce the 20:22 ozonide thereof, decomposing the ozonide to the 20-ketone, and isolating the progesterone thus obtained.

4. The process according to claim 3, wherein the acylating agent is a carboxylic acid anhydride.

5. A process for the conversion of stigmastadienone to progesterone, comprising: ozonizing stigmastadienone with an ozonizing agent comprising from about one to 1.5 moles of ozone per mole of ketone to produce stigmastadienone 22:23 ozonide, reductively decomposing the ozonide to produce 3-ketobisnor-4-cholene-22-al with zinc dust and acetic acid, esterifying the 22-hydroxyl group of the enolic form of the 22-aldehyde with acetic anhydride and an esterification catalyst to produce a 22-enol ester of the 3-ketobisnor-4-cholene-22-al, ozonizing the enol ester with an ozonizing agent comprising from about one to 1.5 moles of ozone per mole of enol ester to produce the 20:22 ozonide thereof, decomposing the ozonide to the 20-ketone, hydrolyzing the product with dilute alcoholic mineral acid, and isolating the progesterone thus obtained.

6. The process of claim 5, wherein the decomposition of the 20:22 ozonide to the 20-ketone is with zinc dust and acetic acid.

7. 3-Ketobisnor-4-cholene-22-al.

8. The 22-enol acetate of 3-ketobisnor-4-cholene-22-al.

FREDERICK W. HEYL.
MILTON E. HERR.

REFERENCES CITED

The following references are of record in the file of this patent:

UNITED STATES PATENTS

| Number | Name | Date |
|---|---|---|
| 2,433,848 | Julian | Jan. 6, 1948 |